US008040987B2

(12) United States Patent
Oh et al.

(10) Patent No.: US 8,040,987 B2
(45) Date of Patent: Oct. 18, 2011

(54) CHANNEL ESTIMATING APPARATUS AND METHOD FOR USE IN A BROADBAND WIRELESS COMMUNICATION SYSTEM

(75) Inventors: Jeong-Tae Oh, Yongin-si (KR);
Myung-Kwang Byun, Suwon-si (KR);
Jae-Ho Jeon, Seongnam-si (KR);
Seung-Joo Maeng, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 828 days.

(21) Appl. No.: 11/943,775

(22) Filed: Nov. 21, 2007

(65) Prior Publication Data
US 2008/0123759 A1    May 29, 2008

(30) Foreign Application Priority Data

Nov. 23, 2006    (KR) .......................... 10-2006-0116146

(51) Int. Cl.
*H04B 1/10*    (2006.01)

(52) U.S. Cl. .......................... 375/349; 375/285; 375/350

(58) Field of Classification Search .................. 375/260, 375/146, 348, 130, 132, 136, 259, 316, 346, 375/349, 350, 285; 370/208, 344, 342, 333
See application file for complete search history.

(56) References Cited

U.S. PATENT DOCUMENTS

| 6,441,786 B1 | 8/2002 | Jasper et al. | |
|---|---|---|---|
| 6,453,177 B1 * | 9/2002 | Wong et al. | 455/562.1 |
| 6,952,394 B1 * | 10/2005 | Kim et al. | 370/208 |
| 7,023,928 B2 * | 4/2006 | Laroia et al. | 375/260 |
| 2005/0152485 A1 * | 7/2005 | Pukkila et al. | 375/348 |
| 2006/0009224 A1 * | 1/2006 | Lim et al. | 455/442 |
| 2007/0098050 A1 * | 5/2007 | Khandekar et al. | 375/146 |
| 2007/0159959 A1 * | 7/2007 | Song et al. | 370/208 |
| 2007/0217615 A1 * | 9/2007 | Rajagopal et al. | 381/15 |
| 2008/0025264 A1 * | 1/2008 | Willenegger et al. | 370/333 |
| 2008/0062946 A1 * | 3/2008 | Jeong | 370/342 |
| 2008/0109701 A1 * | 5/2008 | Yu et al. | 714/760 |
| 2008/0123616 A1 * | 5/2008 | Lee | 370/344 |
| 2008/0123760 A1 * | 5/2008 | Oh et al. | 375/260 |
| 2008/0192857 A1 * | 8/2008 | Miyoshi et al. | 375/285 |
| 2010/0142490 A1 * | 6/2010 | Kim et al. | 370/335 |
| 2010/0226453 A1 * | 9/2010 | Wang et al. | 375/260 |

FOREIGN PATENT DOCUMENTS

KR    10-2006-0039776 A    5/2006

* cited by examiner

*Primary Examiner* — David C. Payne
*Assistant Examiner* — James M Perez
(74) *Attorney, Agent, or Firm* — Jefferson IP Law, LLP

(57) ABSTRACT

A Channel estimating apparatus and method for use in a broadband wireless communication system are provided. The receiving method includes determining a control unit for a channel estimation using burst allocation information of selected sectors; extracting pilot symbols from received data based on the control unit; and acquiring a channel estimate value for each transmission unit by performing a Joint Channel Estimation (JCE) with the extracted pilot symbols that are based on the control unit.

22 Claims, 7 Drawing Sheets

PUSC SUBCHANNEL-TILE

| P(0) | DATA | P(2) |
|------|------|------|
| DATA | DATA | DATA |
| DATA | DATA | DATA |
| P(1) | DATA | P(3) |

FIG.3A

AMC SUBCHANNEL- SLOT

SUBCARRIER ↑

| DATA | DATA | DATA |
|------|------|------|
| P(0) | DATA | DATA |
| DATA | DATA | DATA |
| DATA | DATA | DATA |
| DATA | P(1) | DATA |
| DATA | DATA | DATA |
| DATA | DATA | DATA |
| DATA | DATA | P(2) |
| DATA | DATA | DATA |
| DATA | DATA | DATA |
| P(3) | DATA | DATA |
| DATA | DATA | DATA |
| DATA | DATA | DATA |
| DATA | P(4) | DATA |
| DATA | DATA | DATA |
| DATA | DATA | DATA |
| DATA | DATA | P(5) |
| DATA | DATA | DATA |

→ OFDMA SYMBOL

FIG.3B

CHANNEL ESTIMATING APPARATUS AND METHOD FOR USE IN A BROADBAND WIRELESS COMMUNICATION SYSTEM

PRIORITY

This application claims the benefit under 35 U.S.C. §119 (a) of a Korean patent application filed on Nov. 23, 2006 in the Korean Intellectual Property Office and assigned Serial No. 2006-0116146, the entire disclosure of which is hereby incorporated by reference.

BACKGROUND OF THE INVENTION

1. Field of the Invention

The present invention relates to a receiver and a receiving method for use in a wireless communication system. More particularly, the present invention relates to a channel estimating apparatus and method which takes into account neighbor sector or cell interference in a broadband multiple access wireless communication system.

2. Description of the Related Art

Communication systems were originally developed to provide voice services. Now, communication systems are being developed to provide packet data services and various multimedia services as well as voice services. An exemplary system capable of providing wireless packet data services is a third generation (3G) mobile communication system. The 3G mobile communication system provides various high speed multimedia services. The 3G mobile communication system distinguishes users using a Code Division Multiple Access (CDMA) scheme. The CDMA scheme distinguishes channels by allocating different orthogonal codes to users or to data transmitted to users.

However, the 3G mobile communication system fails to provide high speed data with high quality because of a lack of available codes. In other words, since the amount of usable codes are restricted, transmission rates are limited. To address this problem, researches and developers of mobile communication systems are considering a next-generation communication system which is referred to as the fourth generation (4G) broadband wireless communication system. The broadband wireless communication system is able to classify and transmit users or data to be sent, using an Orthogonal Frequency Division Multiple Access (OFDMA) scheme. The 4G wireless communication system features a high transmission rate of up to 100 Mbps. Furthermore, unlike the 3G system, the 4G system can provide services having various level of Quality of Service (QoS).

Currently, the 4 G communication system is being developed to guarantee mobility and QoS in a Broadband Wireless Access (BWA) communication system such as wireless Local Area Network (LAN) system and wireless Metropolitan Area Network (MAN) system. Exemplary communication systems include the Institute of Electrical and Electronics Engineers (IEEE) 802.16d communication system and the IEEE 802.16e communication system. However, various other systems using the OFDMA scheme are under development.

As discussed above, the broadband wireless communication system adopts the OFDMA scheme, ensures mobility, and utilizes the same frequency in every cell to increase frequency efficiency.

FIG. 1 is a simplified diagram of a conventional BWA system implemented with multiple cells.

In FIG. 1, Base Station (BS) 0, BS 1, and BS 2 are each communicating within their respective cells 100, 101 and 102 using the same frequency. In this situation, the multicell system has a frequency reutilization of '1,' thereby increasing its frequency efficiency. However, by using the same frequency in adjacent cells, the resulting inter-cell or inter-sector interference may impair the performance of the system.

For example, in view of a Mobile Station (MS) 103 communicating with BS 0, a transmit signal of an MS 104 communicating with BS 1 of the neighboring cell and a transmit signal of an MS 105 communicating with BS 2 of the neighboring cell acts as interference signals to BS 0. In other words, BS 0 receives the interference signals 107 and 108 in addition to the received signal 106 from MS 103 in its cell. The interference signals of the neighboring cells affects the signal of MS 103 in the corresponding cell and thus deteriorates demodulation performance.

Therefore, a need exists for an apparatus and method for canceling interference caused by neighboring cells in a multicell system.

SUMMARY OF THE INVENTION

An aspect of the present invention is to address at least the above problems and/or disadvantages and to provide at least the advantages below. Accordingly, an aspect of exemplary embodiments of the present invention is to provide an apparatus and method for canceling inter-cell or inter-sector interference in a broadband wireless communication system.

Another aspect of exemplary embodiments of the present invention is to provide an apparatus and method for estimating channels by taking into account inter-cell or inter-sector) in a broadband wireless communication system.

A further aspect of exemplary embodiments of the present invention is to provide an apparatus and method for determining a unit of channel estimation using burst allocation information of interfering cells when the channel is estimated by taking into account inter-cell or inter-sector interference in a broadband wireless communication system.

The above aspects are achieved in an exemplary embodiment of the present invention by providing a receiver in a broadband wireless communication which includes a determiner for determining a control unit for a channel estimation using burst allocation information of selected sectors; an extractor for extracting pilot symbols from received data based on the control unit; and a channel estimator for acquiring a channel estimate value for each transmission unit by performing a Joint Channel Estimation (JCE) with the pilot symbols output from the extractor that re based on the control unit.

According to one aspect of an exemplary embodiments of the present invention, a receiving method in a broadband wireless communication system includes determining a control unit for a channel estimation by using burst allocation information of selected sectors; extracting pilot symbols from received data based on the control unit; and acquiring a channel estimate value for each transmission unit by performing a Joint Channel Estimation (JCE) with the extracted pilot symbols that are based on the control unit.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of the present invention will become more apparent from the following detailed description when taken in conjunction with the accompanying drawings, in which:

FIGS. 3A and 3B illustrate a subchannel structure for uplink transmission in the BWA system, according to an exemplary embodiment of the present invention;

Throughout the drawings, it should be noted that like reference numbers are used to depict the same or similar elements, features and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Exemplary embodiments of the present invention provide a channel estimation technique which takes into account inter-cell or inter-sector interference in a Broadband Wireless Access (BWA) communication system.

While a BWA communication system is illustrated by way of example, the present invention is applicable to any multi-cell communication system. While a receiver (uplink) of a Base Station (BS) is explained by way of example, the exemplary embodiments of present invention are applicable to any receiver of a BS and a user terminal.

Figure 1:
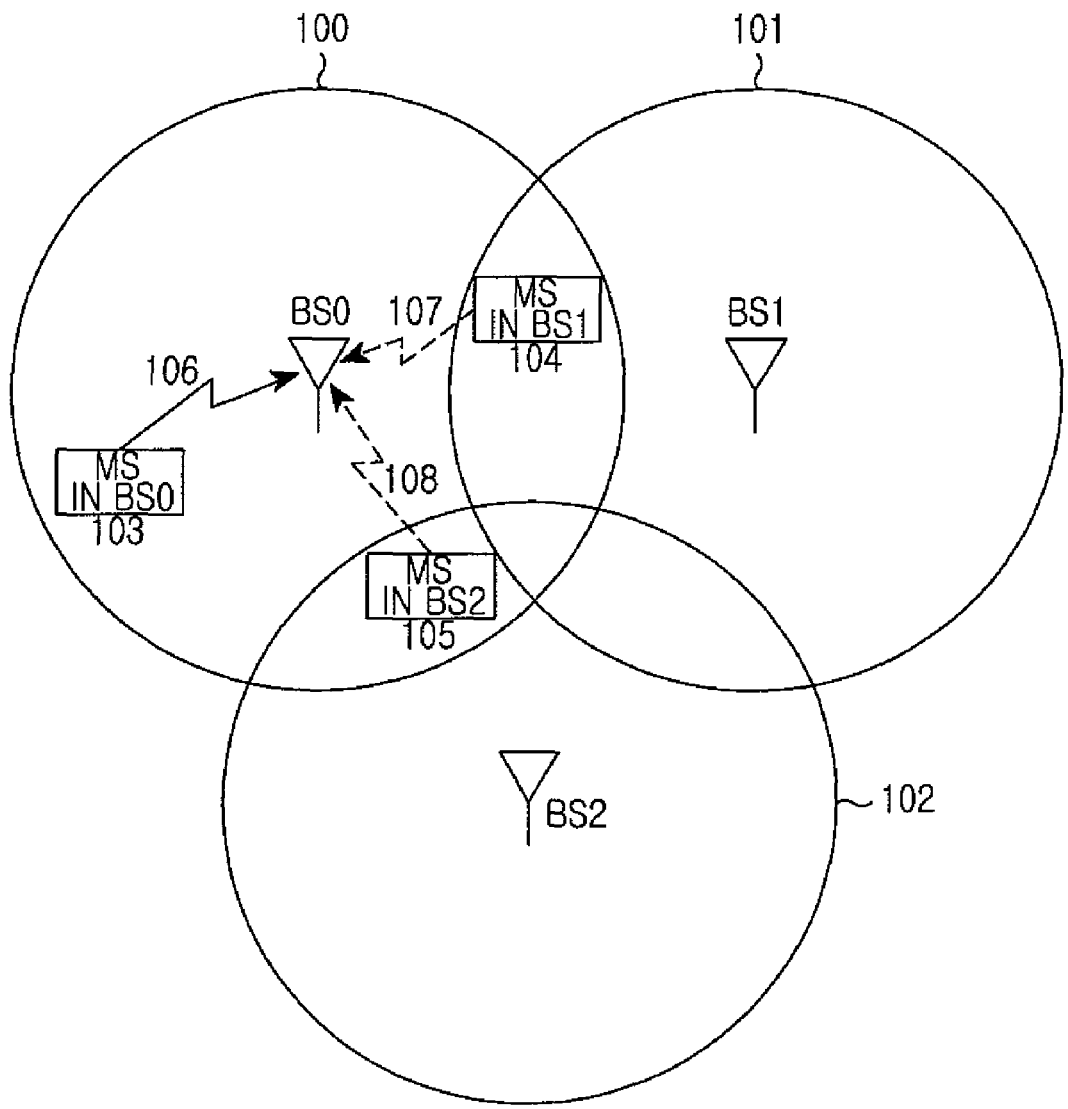
FIG. 1 illustrates a conventional multicell Broadband Wireless Access (BWA) system.
Figure 2:
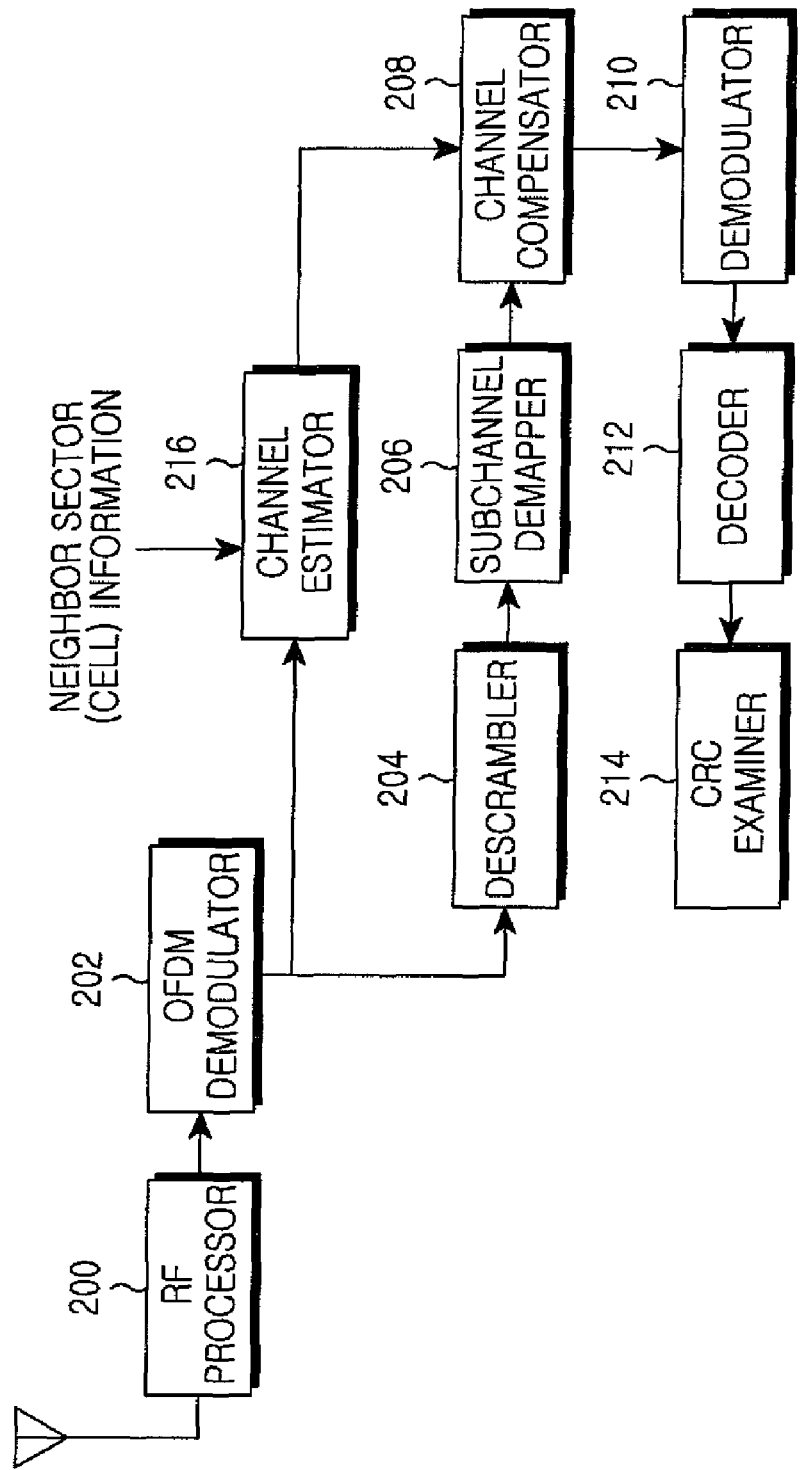
FIG. 2 illustrates a receiver in a BWA system according to an exemplary embodiment of the present invention.

FIG. 2 illustrates a receiver in a BWA system according to an exemplary embodiment of the present invention.

The receiver of FIG. 2 includes a Radio Frequency (RF) processor 200, an Orthogonal Frequency Division Multiplexing (OFDM) demodulator 202, a descrambler 204, a subchannel demapper 206, a channel compensator 208, a demodulator 210, a decoder 212, a Cyclic Redundancy Check (CRC) examiner 214, and a channel estimator 216. Hereafter, to ease the understanding of the present invention, the cancellation of inter-sector interference is described. However, exemplary embodiments of the present invention are equally applicable to inter-cell interference.

The RF processor 200 includes components such as a filter and a frequency converter. The RF processor 200 converts an RF signal received by an antenna into a baseband signal and converts the baseband signal into a digital signal.

The OFDM demodulator 202 outputs frequency-domain data by Fast Fourier Transform (FFT)-processing the sample data output from the RF processor 200. The descrambler 204 descrambles the data output from the OFDM demodulator 202 with codes that are uniquely allocated to sectors.

The subchannel demapper 206 extracts and arranges data of a burst to be demodulated from the data output from the descrambler 204.

The channel estimator 216 receives burst allocation information of the selected sectors, such as the sectors interfering with each other. Further, the channel estimator 216 determines a control unit for the channel estimation using the burst allocation information of the sectors. The channel estimator 216 extracts pilot symbols from the data output from the OFDM demodulator 202 based on the determined control unit. Moreover, the channel estimator 216 acquires a channel estimate value by a certain unit, such as by the tile in the case of a Partial Usage of SubCarrier (PUSC) subchannel. The channel estimator 216 acquires a channel estimate value by estimating the channel with the extracted pilot symbols, as discussed in further detail below. That is, the channel estimator 216 acquires the channel estimate values of a desired sector and the interfering sectors. Next, the channel estimator 216 calculates a total channel value for the burst to be demodulated using the acquired channel estimate values, and provides the calculated channel value to the channel compensator 208. The channel estimator 216 will be described in further detail below by referring to FIG. 4.

The channel compensator 208 channel-compensates the data output from the subchannel demapper 206 using the channel value provided by the channel estimator 216.

The demodulator 210 demodulates the data output from the channel compensator 208. Herein, the demodulator 210 generates and outputs a Log Likelihood Ratio (LLR) value for use in soft decision decoding.

The decoder 212 outputs an information bit stream by decoding the data from the demodulator 210. The CRC examiner 214 extracts a CRC code from the information bit stream output from the decoder 212 and checks for error by comparing a CRC code generated from the received information bit stream and the extracted CRC code.

FIGS. 3A and 3B illustrate a subchannel structure for an uplink transmission in the BWA system.

FIG. 3A depicts a tile of a PUSC subchannel and FIG. 3B depicts a slot of an Adaptive Modulation and Coding (AMC) subchannel.

The tile of FIG. 3A includes 4 consecutive subcarriers (tones) in a frequency axis and 3 OFDM symbols in a time axis. That is, one tile includes 12 (=4 tones×3 OFDM symbols) tones in total. At this time, 8 tones are data tones and 4 tones are pilot tones. The pilot tones carry a preset signal (pilot signal) that is known to a Base Station (BS) and a terminal and their positions are predefined. A channel estimate value for 8 data symbols of the tile is calculated using the 4 pilot symbols.

The slot of FIG. 3B includes 18 adjacent tones in the frequency axis and 3 consecutive OFDM symbols in the time axis. That is, one slot includes 54 (=18 tones×3 OFDM symbols) tones in total. Among them, 6 tones are pilot tones and 48 tones are data tones.

Now, an example is described where the PUSC subchannel structure of FIG. 3A is used.

When inter-sector interference is present, severe performance deterioration of the channel estimation may result. Thus, to overcome this problem, a Joint Channel Estimation (JCE) in consideration of the inter-sector interference is performed based on Equation (1). Equation (1) assumes that there are 3 sectors.

$$P = \begin{bmatrix} P_0(0) & P_1(0) & P_2(0) \\ P_0(1) & P_1(1) & P_2(1) \\ P_0(2) & P_1(2) & P_2(2) \\ P_0(3) & P_1(3) & P_2(3) \end{bmatrix} \quad (1)$$

$$\hat{h} = (P^H P)^{-1} P^H Y$$

In Equation (1), the matrix P arranges a scrambling pattern applied to the tile of the three sectors. In the element $P_c(k)$ of the matrix, c indicates a sector index (c=0~C−1) and k indicates a pilot tone index (k=0~K−1). Accordingly, the value $P_c(k)$ can have a value of +1 or −1.

Y, which indicates a received signal, is a vector comprising received signal values with respect to the 4 pilot tones. ĥ indicates a vector of the channel estimate values for the corresponding tile.

The variables in Equation (1) are generalized based on the number of the interfering sectors and the number of the pilot tones in the channel estimate unit as follows:
P=[number of pilot tones×number of the interfering sectors] matrix
Y=[number of the pilot tones] vector
ĥ=[number of the interfering sectors] vector
When the channel estimation is performed using Equation (1), a channel estimate value is acquired with respect to each interfering sector per tile. When there is no inverse matrix $((P^H P)^{-1})$, it is impossible to get the channel estimate value. When using 4 pilot tones (K=4), there is a 12.5% probability that no inverse matrix exits for two sectors (C=2). Furthermore, when using 4 pilot tones (K=4), there is a 34.4% probability that no inverse matrix will be acquired for three sectors (C=3). As such, the number of tiles corresponds to the probability of not acquiring the channel estimation. With 4 tones, up to four sectors (C=4) can be distinguished. In this case, there is a 59.0% probability that no inverse matrix is acquired. In Equation (1), since the number of pilot tones determines the maximum number of channel-estimatable sectors (or cells) and the probability of the inverse matrix, it is necessary to determine a unit of the channel estimation by taking into account these factors.

Figure 4:
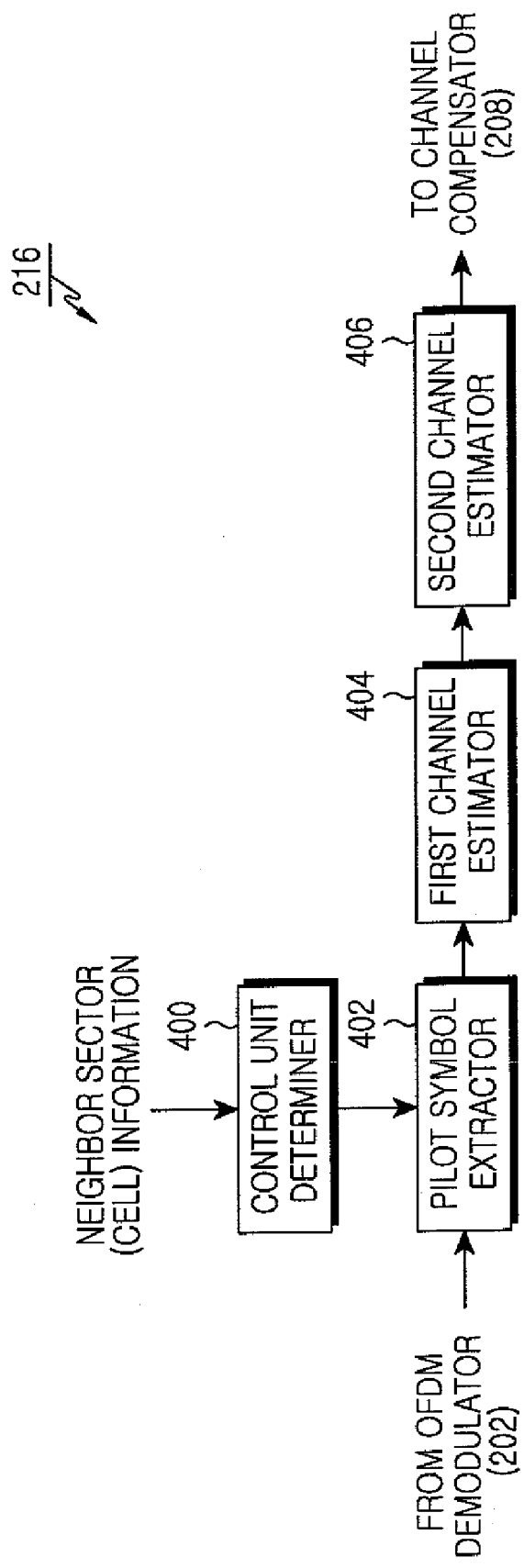
FIG. 4 illustrates a channel estimator according to an exemplary embodiment of the present invention.

FIG. 4 illustrates the channel estimator 216 according to an exemplary embodiment of the present invention.

The channel estimator 216 of FIG. 4 includes a control unit determiner 400, a pilot symbol extractor 402, a first channel estimator 404, and a second channel estimator 406.

The control unit determiner 400 receives the burst allocation information of the selected sectors (the interfering sectors) and determines the control unit of the channel estimation using the burst allocation information. Herein, the burst allocation information indicates the position and the size of the allocated resource, the adopted subchannel scheme, and the scrambling code values masked to the pilot symbols. The determination of the control unit will be explained in further detail below by referring to FIG. 6.

The pilot symbol extractor 402 extracts and outputs the pilot symbols from the data output from the OFDM demodulator 202 based on the determined control unit. The first channel estimator 404 acquires the channel estimate values per tile by estimating the channel with the pilot symbols that are based on the control unit, wherein the pilot symbols are provided from the pilot symbol extractor 402 based on Equation (1).

The second channel estimator 406 calculates the total channel values for the burst to be demodulated using the tile channel estimate value per tile provided from the first channel estimator 404, and provides the calculated channel values to the channel compensator 208. The channel values for the entire subcarriers of the burst can be acquired by applying the tile channel estimate value to every tone (subcarrier) of the corresponding tile in the simplest manner, or by linearly interpolating the channel estimate values.

Figure 5:
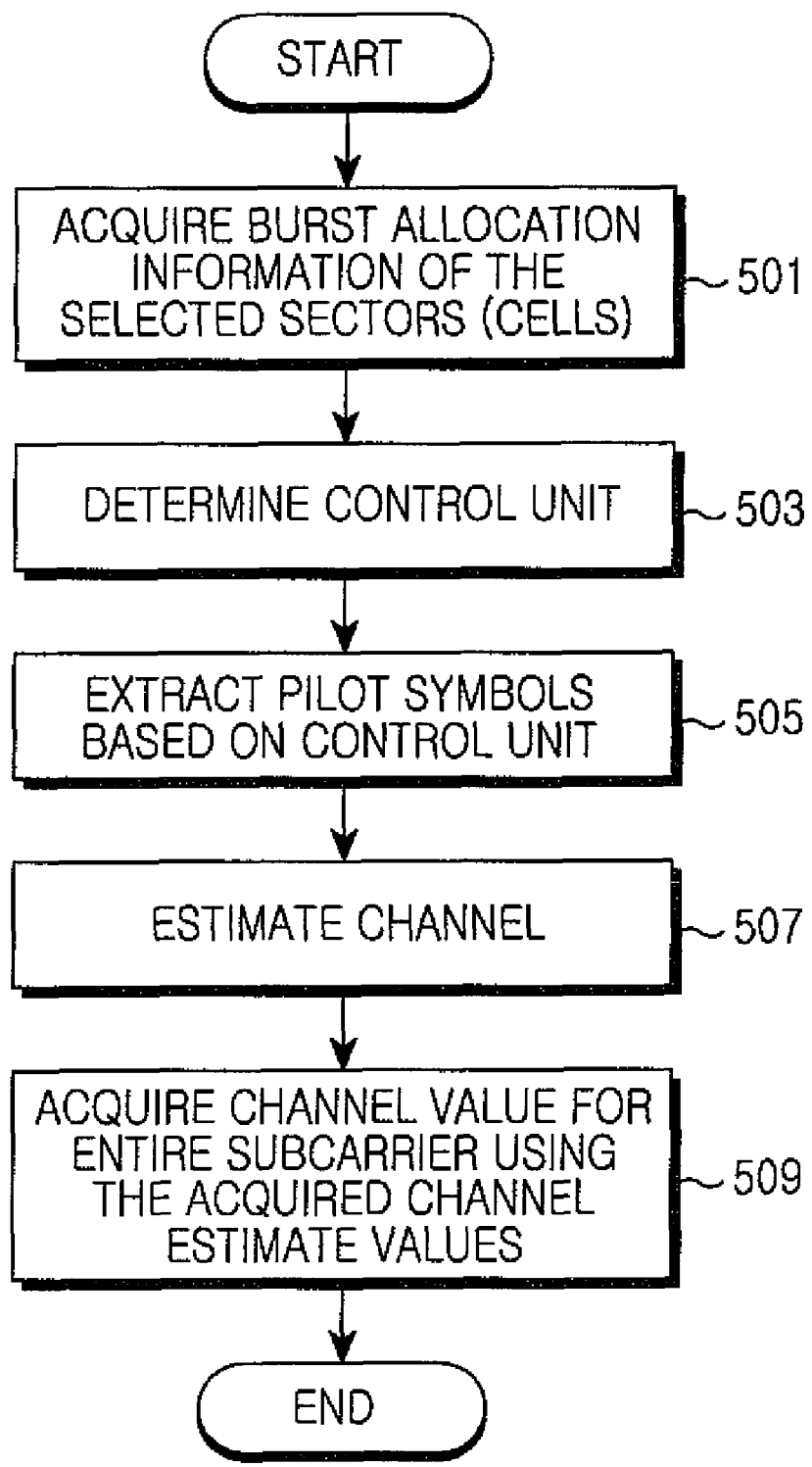
FIG. 5 illustrates operations of the channel estimator according to an exemplary embodiment of the present invention.

FIG. 5 illustrates detailed operations of the channel estimator 216 according to an exemplary embodiment of the present invention.

The channel estimator 216 acquires the burst allocation information of the selected sectors (the interfering sectors) in step 501. Herein, the burst allocation information signifies the position and the size of the allocated resource, the adopted subchannel scheme, and the scrambling code values masked to the pilot symbols.

Upon acquiring the burst allocation information of the selected sectors, the channel estimator 216 determines a control unit for the channel estimation using the burst allocation information of the sectors in step 503. The control unit is the unit which maximizes the number of pilot tones allowing the channel estimation with respect to the selected sectors.

For example, in the case of the PUSC subchannel structure which performs the subchannel rotation per three OFDM symbols, the tile is not consecutively allocated in both the time and frequency axes. Accordingly, the control unit in the frequency axis is one tile (4 tones) and the control unit in the time axis is also one tile (3 OFDM symbols).

For example, in the PUSC subchannel which consecutively allocates the tiles in the time axis without the subchannel rotation, the control unit in the frequency axis is one tile (4 tones) and the control unit in the time axis is set to a length allowing for the channel estimation in the corresponding sector set.

For example, in the uplink AMC subchannel which consecutively allocates resources along the time axis in a specific frequency domain, the control unit in the frequency axis is at least one bean (9 tones) and the control unit in the time axis is set to a length allowing for the channel estimation in the corresponding sector set.

As described above, when the control unit of the channel estimation is determined, the channel estimator 216 extracts the pilot symbols from the OFDM-demodulated data based on the determined control unit in step 505. In step 507, the channel estimator 216, based on Equation (1), estimates the channels using the pilot symbols extracted that are based on the control unit. That is, the channel estimator 216 acquires the channel estimate values of the desired sector and the interfering sectors per tile. Next, in step 509, the channel estimator 216 calculates the total channel value for the burst to be demodulated using the acquired channel estimate values and provides the calculated channel values to the channel compensator 208. The channel value of the entire burst subcarrier can be calculated by merely applying the tile channel estimate values to every subcarrier of the corresponding tile, or by linearly interpolating the acquired channel estimate values.

By way of example, a determination of a control unit of the channel estimation is described below.

Figure 6:
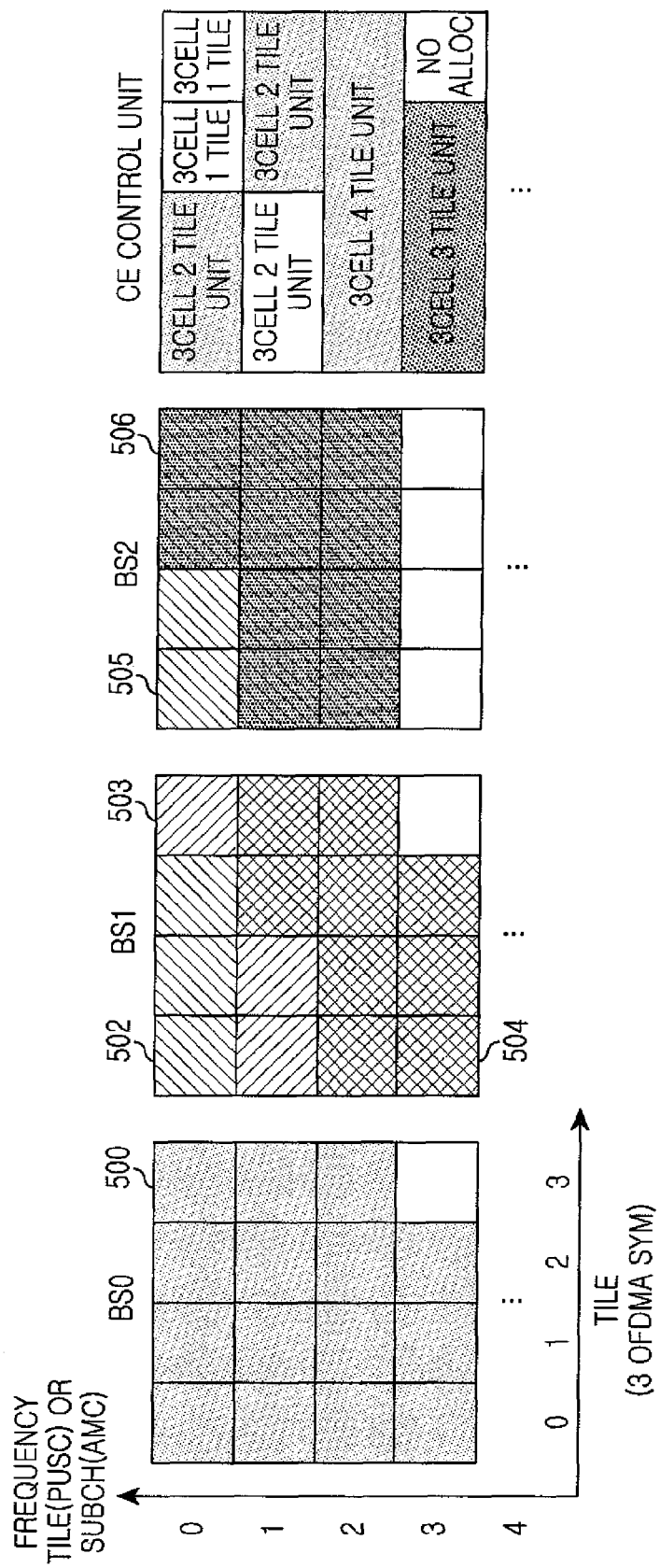
FIG. 6 illustrates a control unit determining method for channel estimation, according to an exemplary embodiment of the present invention.

FIG. 6 illustrates a control unit determining method for the channel estimation according to an exemplary embodiment of the present invention. The PUSC subchannel structure is as an example in the description below.

It is assumed that there are 3 cells (or sectors) interfering with each other and that a BS0 demodulates the received signal. Further, it is assumed that BS1 and BS2 interfere with the BS0. It is assumed that one burst 500; that is, 15 PUSC tiles that are allocated to the BS0. It is assumed that 3 bursts 502, 503 and 504; that is, 3 PUSC tiles 502, 3 PUSC tiles 503, and 9 PUSC tiles 504 are allocated to the BS1. It is assumed that 2 bursts; that is, 2 PUSC tiles 505 and 10 PUSC tiles 506 are allocated to the BS2. In this situation, 7 control units can be generated as shown in FIG. 6.

The basic unit in the frequency axis is a tile (4 tones) and the basic unit in the time axis is 3 OFDM symbols. After the number of consecutive tiles (the number of tiles belonging to the same burst) along the time axis are counted from a certain point with respect to each BS, the smallest number of the counted tile numbers is set to the control unit length, which is described below.

(1) Set the 0-th tile in the frequency axis and the time axis to the start.
(2) Count the number of consecutive tiles in the time axis from a certain start point with respect to each sector.
(3) Set the smallest value among the counted tile numbers to the control unit length.
(4) Set a tile following the set control unit as the start.
(5) When the control unit in the time axis is determined, move to the next frequency band and return to (2).

In FIG. 6, the BS0 occupies 4 consecutive tiles from the 0-th tile, the BS1 occupies 3 consecutive tiles from the 0-th tile, and the BS2 occupies 2 consecutive tiles from the 0-th file. Accordingly, the length of the control unit is set to 2 and the start point is set to the second tile. Since the BS0 occupies 2 consecutive tiles from the second tile, the BS1 occupies one consecutive tile from the second tile, and the BS2 occupies 2 consecutive tiles from the second tile, the length of the control unit is set to 1. When the control unit in the time axis is finally determined, the control unit of the frequency axis is determined in the similar way.

Figure 7:
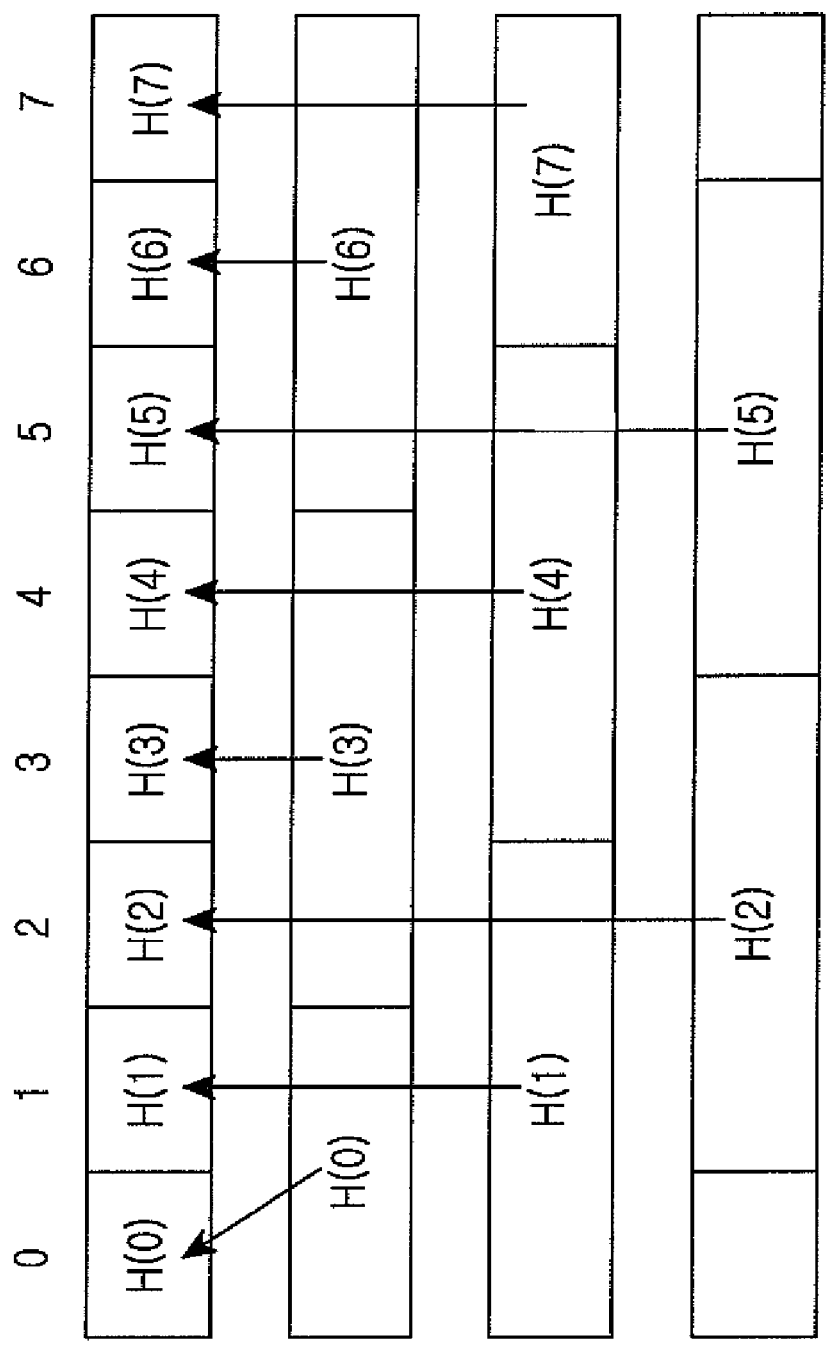
FIG. 7 illustrates a channel estimation method within the control unit for channel estimation, according to an exemplary embodiment of the present invention.

FIG. 7 illustrates an exemplary channel estimation method within the control unit of the channel estimation.

There are 8 tiles in the control unit and the channel estimate value is generated by the tile unit. The channel estimation is carried out in the 3-tile (window) sliding scheme using Equation (1). Herein, the sliding scheme estimates the channel using every pilot symbol before and after the tile to be estimated. When there is no front tile H(0) or no preceding tile H(7), the channel is estimated with two tiles. When there is neither the front tile nor the preceding tile, the channel can be estimated merely with the tile to be estimated.

In FIG. 7, the channel estimate value H(0) of the 0-th tile is calculated using the pilot symbols of the 0-th tile and the first tile (8 pilot symbols in total) and the channel estimate value H(1) of the first tile is calculated using the pilot symbols of the 0-th tile, the first tile, and the second tile (12 pilot symbols in total). The channel estimate value H(2) of the second tile is calculated using the pilot symbols of the first tile, the second tile and the third tile, and the channel estimate value H(3) of the third tile is calculated using the pilot symbols of the second tile, the third tile, and the fourth tile. The channel estimate value H(4) of the fourth tile is calculated using the pilot symbols of the third tile, the fourth tile, and the fifth tile, and the channel estimate value H(5) of the fifth tile is calculated using the pilot symbols of the fourth tile, the fifth tile, and the sixth tile. The channel estimate value H(6) of the sixth tile is calculated using the pilot symbols of the fifth tile, the sixth tile, and the seventh tile, and the channel estimate value H(7) of the seventh tile is calculated using the pilot symbols of the sixth tile and the seventh tile. As indicated earlier in Equation (1), the channel estimate value calculated for each tile is the vector constituted by the channel values of the desired sector and the interfering sectors.

As such, when the channel is estimated using 3 tiles, 12 pilot symbols in total can be used. When the channel is estimated using 3 AMC slots, 18 pilot symbols in total can be used. The method in FIG. 7 is a merely an example. Note that the channel estimation scheme in the control unit may vary according to the type of radio channel, the terminal environment (data rate), the data service type, and the Quality of Service (QoS).

As set forth above, by considering the interference in the multicell wireless communication system where the inter-cell or the inter-sector interference exists, the channel estimation can be accurately carried out. Namely, the present invention can enhance the demodulation performance (decoding performance) by performing accurate channel estimation and can increase the cell capacity.

Certain aspects of the present invention can also be embodied as computer readable code on a computer readable recording medium. A computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion. Also, functional programs, code, and code segments for accomplishing the present invention can be easily construed by programmers skilled in the art to which the present invention pertains.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A receiver in a broadband wireless communication comprising:
   a determiner for determining a control unit for a channel estimation using burst allocation information of selected sectors, the control unit comprising a length measured in a number of counted tiles which maximizes a number of pilot tones allowing the channel estimation with respect to the selected sectors;
   an extractor for extracting pilot symbols from received data based on the control unit; and
   a channel estimator for acquiring a channel estimate value for each transmission unit by performing a Joint Channel Estimation (JCE) with the pilot symbols output from the extractor that are based on the control unit,
   wherein the JCEs are generalized based on a number of interfering sectors and a number of pilot tones in the control unit.

2. The receiver of claim 1, further comprising:
   a compensator for channel-compensating received burst data using the channel estimate values output from the channel estimator.

3. The receiver of claim 2, further comprising:
an OFDM demodulator for Fast Fourier Transform (FFT)-processing the received data;
a descrambler for descrambling data output from the OFDM demodulator with codes uniquely allocated to the sectors; and
a subchannel demapper for extracting burst data to be demodulated from the data output from the descrambler and providing the extracted burst data to the channel compensator.

4. The receiver of claim 2, further comprising:
a demodulator for demodulating data output from the channel compensator; and
a decoder for decoding data output from the demodulator.

5. The receiver of claim 1, wherein the determiner counts a number of consecutive transmission units from an end of a previous control unit in a time axis with respect to each of the sectors, and sets the smallest value of the counted transmission unit numbers as a length of the control unit.

6. The receiver of claim 1, wherein the determiner determines the control unit to maximize a number of pilot symbols for the JCE.

7. The receiver of claim 1, wherein the control unit comprises consecutive Orthogonal Frequency Division Multiplexing (OFDM) symbols in a time axis and adjacent subcarriers in a frequency axis.

8. The receiver of claim 1, wherein, when the number of the selected sectors is 3 and the number of the pilot symbols in the control unit is 4, the channel estimator estimates the channel based on the following equation:

$$\hat{h} = (P^H P)^{-1} P^H Y$$

$$P = \begin{bmatrix} P_0(0) & P_1(0) & P_2(0) \\ P_0(1) & P_1(1) & P_2(1) \\ P_0(2) & P_1(2) & P_2(2) \\ P_0(3) & P_1(3) & P_2(3) \end{bmatrix}$$

where $P_c(k)$ is a scrambling code value applied to a k-th pilot tone of a c-th sector, Y is a receive vector, and $\hat{h}$ is a vector constituted by channel estimate values of sectors.

9. The receiver of claim 1, wherein the transmission unit is a tile of a Partial Usage of SubCarrier (PUSC) subchannel or a slot of an Adaptive Modulation and Coding (AMC) subchannel.

10. The receiver of claim 1, wherein the channel estimator performs the JCE using a window sliding scheme with respect to one control unit.

11. The receiver of claim 1, wherein the burst allocation information comprises at least one of a position of an allocated resource, a size of the allocated resource, a subchannel scheme, and a scrambling code value masked to the pilot symbol.

12. A receiving method in a broadband wireless communication system, comprising:
determining a control unit for a channel estimation by using burst allocation information of selected sectors, the control unit comprising a length measured in a number of counted tiles which maximizes a number of pilot tones allowing the channel estimation with respect to the selected sectors;
extracting pilot symbols from received data based on the control unit; and
acquiring a channel estimate value for each transmission unit by performing a Joint Channel Estimation (JCE) with the extracted pilot symbols that are based on the control unit,
wherein the JCEs are generalized based on a number of interfering sectors and a number of pilot tones in the control unit.

13. The receiving method of claim 12, further comprising:
channel-compensating received burst data using the acquired channel estimate values.

14. The receiving method of claim 13, further comprising:
OFDM-demodulating by Fast Fourier Transform (FFT)-processing the received data;
descrambling the OFDM-demodulated data with codes uniquely allocated to the sectors; and
extracting the burst data from the descrambled data.

15. The receiving method of claim 13, further comprising:
demodulating the channel-compensated data; and
restoring an information bit stream by decoding the demodulated data.

16. The receiving method of claim 12, wherein the determining a control unit comprises:
counting a number of consecutive transmission units from an end of a previous control unit in a time axis with respect to each of the sectors; and
setting the smallest value of the counted transmission unit numbers as a length of the control unit.

17. The receiving method of claim 12, wherein the determining a control unit comprises determining the control unit to maximize a number of pilot symbols for the JCE.

18. The receiving method of claim 12, wherein the control unit comprises consecutive Orthogonal Frequency Division Multiplexing (OFDM) symbols in a time axis and adjacent subcarriers in a frequency axis.

19. The receiving method of claim 12, wherein, when the number of the selected sectors is 3 and the number of the pilot symbols in the control unit is 4, the channel estimate value is calculated based on the following equation:

$$\hat{h} = (P^H P)^{-1} P^H Y$$

$$P = \begin{bmatrix} P_0(0) & P_1(0) & P_2(0) \\ P_0(1) & P_1(1) & P_2(1) \\ P_0(2) & P_1(2) & P_2(2) \\ P_0(3) & P_1(3) & P_2(3) \end{bmatrix}$$

where $P_c(k)$ is a scrambling code value applied to a k-th pilot tone of a c-th sector, Y is a receive vector, and $\hat{h}$ is a vector constituted by channel estimate values of sectors.

20. The receiving method of claim 12, wherein the transmission unit is a tile of a Partial Usage of SubCarrier (PUSC) subchannel or a slot of an Adaptive Modulation and Coding (AMC) subchannel.

21. The receiving method of claim 12, wherein the channel estimate value acquiring comprises performing the JCE using a window sliding scheme with respect to each control unit.

22. The receiving method of claim 12, wherein the burst allocation information comprises at least one of a position of an allocated resource, a size of the allocated resource, a subchannel scheme, and a scrambling code value masked to the pilot symbol.

* * * * *